Sept. 6, 1960 G. P. ADAMS ET AL 2,951,402
APPARATUS FOR STRIPPING A SHEATH FROM A CORE
Filed March 25, 1959 2 Sheets-Sheet 1

INVENTORS
G. P. ADAMS
T. T. BUNCH
BY H. J. Winegar
ATTORNEY

Sept. 6, 1960 G. P. ADAMS ET AL 2,951,402
APPARATUS FOR STRIPPING A SHEATH FROM A CORE
Filed March 25, 1959 2 Sheets-Sheet 2

INVENTORS
G. P. ADAMS
T. T. BUNCH
BY *H. J. Winegar*
ATTORNEY

000
United States Patent Office 2,951,402
Patented Sept. 6, 1960

2,951,402

APPARATUS FOR STRIPPING A SHEATH FROM A CORE

George P. Adams, Baltimore, and Tillman T. Bunch, near Ashland, Md., assignors to Western Electric Company, Incorporated, New York, N.Y., a corporation of New York Filed Mar. 25, 1959, Ser. No. 801,848

2 Claims. (Cl. 81—9.51)

The present invention relates generally to apparatus for stripping a sheath from a core. More particularly, the invention relates to apparatus for reclaiming plastic-sheathed wire by splitting the sheath longitudinally, by separating the split sheath from the bare wire, and by collecting the separated sheath and the bare wire in separate receivers.

Accordingly, an object of the invention is to provide new and improved apparatus for stripping a sheath from a core.

Another object of the invention is to provide, in combination with a wire-stripping apparatus where a sheath is split longitudinally, new and improved means for separating the split sheath from the bare wire.

A more specific object of the invention is to provide apparatus for reclaiming plastic-sheathed wire by splitting the sheath longitudinally, by separating the split sheath from the bare wire, and by collecting the separated sheath and the bare wire in separate receivers.

The present invention is closely related to and is preferably used in conjunction with the sheath-splitting apparatus disclosed in a copending application of T. T. Bunch, M. G. Dinsmore Jr. and G. E. Henning, Serial No. 801,888, filed on March 25, 1959.

The above and other objects are accomplished, according to certain features of the invention, by providing, in combination with a stripping apparatus of the type wherein a sheathed core is advanced therethrough and the sheath is split longitudinally, a separating member having a restricted guide aperture through which only the bare core emerging from the stripping apparatus passes, so that the split sheath and the core are separated thereby. Means may be provided for deflecting the split sheath away from the guide aperture as well as means for advancing the core through the guide aperture. Preferably, the bare core is delivered by the advancing means into an open-topped receiver, while the deflected split sheath passes into a second receiver.

According to the invention, in stripping a plastic-sheathed wire, the separating member may comprise a rotatable pulley having a restricted peripheral groove through which only the bare wire passes, the advancing means may include a slipping capstan arranged to advance the bare wire around the grooved periphery of the pulley at a speed substantially equal to the speed at which the bare wire is discharged from the stripping apparatus, and the deflecting means may comprise a separating blade entering the groove in the pulley and deflecting the sheath away from the groove.

Other objects, advantages and features of the invention will appear from the following detailed description of a specific embodiment thereof, when read in conjunction with the appended drawings, in which.

Figures 1, 4:
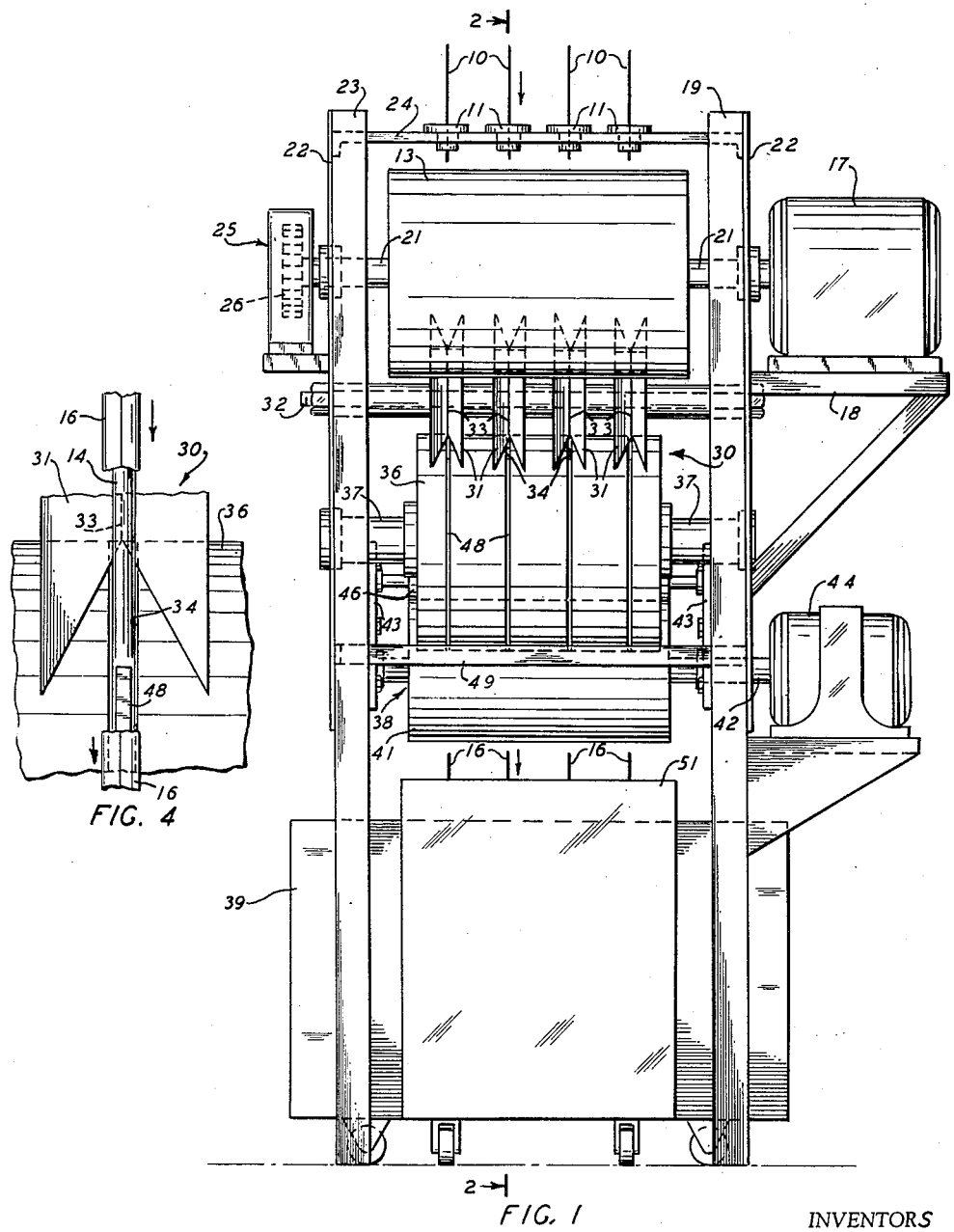
Fig. 1 is a front elevational view of a complete stripping apparatus in accordance with the principles of the invention, with portions of sheathed wires being broken away to reveal structural details of the apparatus.
Fig. 4 is an enlarged fragmentary view taken generally along the line 4—4 of Fig. 2 in the direction of the arrows, having portions of a sheath broken away to reveal details of the separating apparatus.
Figures 2, 3:
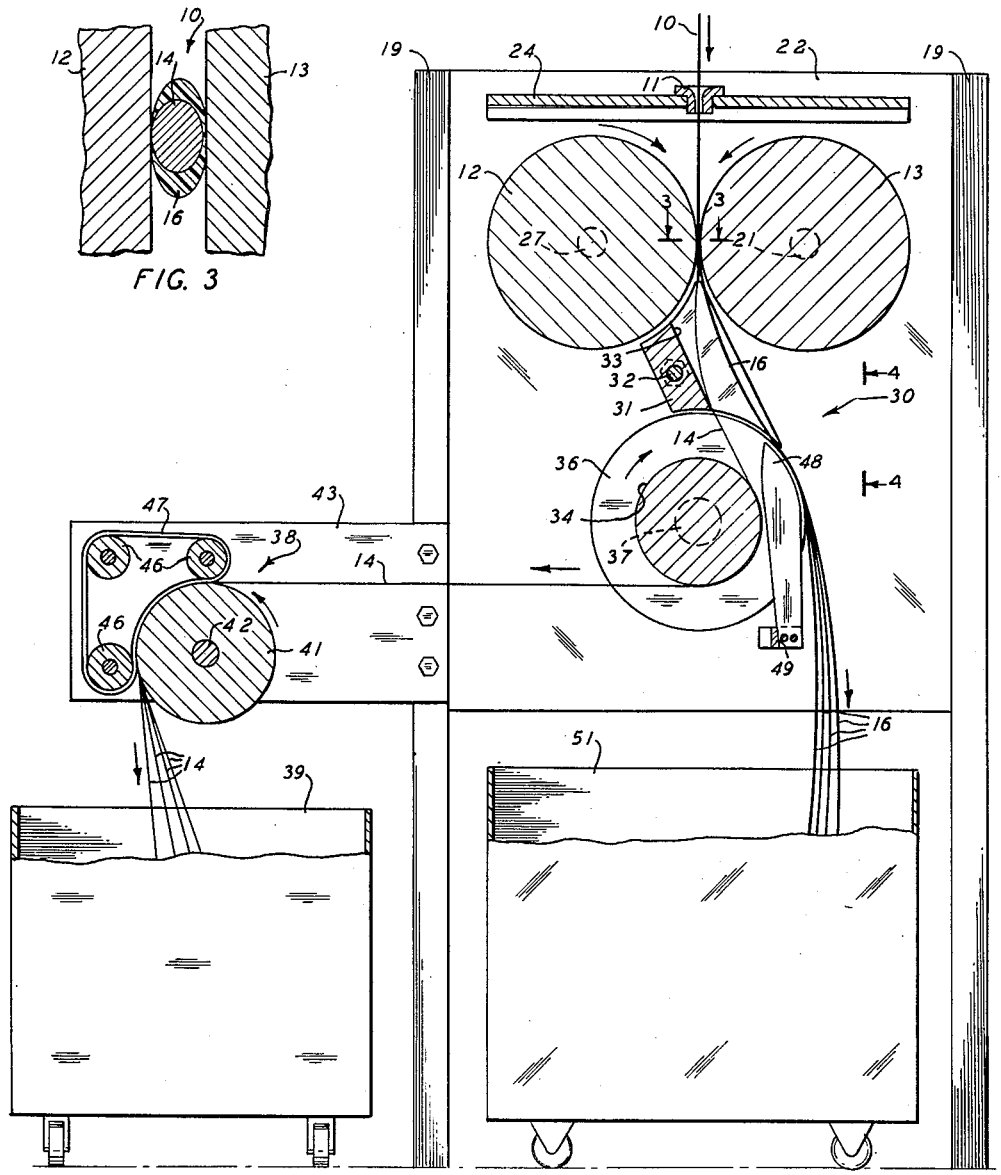
Fig. 2 is a vertical sectional view of the apparatus illustrated in Fig. 1, taken generally along the line 2—2 of Fig. 1 in the direction of the arrows.
Fig. 3 is a fragmentary, enlarged, sectional view illustrating the splitting process, taken generally along the line 3—3 of Fig. 2 in the direction of the arrows.

Referring now in detail to the drawings and in particular to Figs. 1 and 2, four sheathed wires 10—10 to be stripped are passed vertically downward through four spaced guide bushings 11—11 between an opposing pair of crushing rolls 12 and 13. As illustrated in Fig. 3, each of the sheathed wires 10—10 includes a central metallic core or wire 14 of a relatively strong nature, such as a copper conductor, surrounded by a jacket or sheath 16 of a plastic material, such as polyethylene or polyvinyl chloride. The sheathed wires 10—10 may be insulated wires, which are not to be used as such for some reason and which are to be reclaimed by stripping the sheaths 16—16 from the wires 14—14 for reuse of the components or for salvage, separately, as high-grade scrap.

The rolls 12 and 13 are spaced from each other a distance of the order of the diameter of the bare wire 14 and are rotated in opposite directions, as indicated by the arrows in Fig. 2, to pull the sheathed wires 10—10 therebetween. Preferably, one of the rolls (the roll 12) is rotated faster than the other (the roll 13), as described in the aforementioned Bunch et al. application, to split the sheath 14 longitudinally along the side adjacent to the faster roll 12.

As illustrated in Fig. 1, the slower roll 13 is positively driven by a suitable drive motor 17 which is mounted on a platform 18 at the right of the apparatus, the platform 18 being secured between a first pair of upright supporting posts 19—19. The roll 13 is a solid cylinder and is provided at either end with a short shaft 21. The motor 17 is arranged to drive the shaft 21 at the right of Fig. 1, the shafts 21—21 being journalled between a pair of opposing support plates 22—22. One of the plates 22—22 is mounted between the posts 19—19 at the right of Fig. 1 and the other plate 22 is mounted between a corresponding pair of posts 23—23 (one being shown) at the left of Fig. 1. The guide bushings 11—11, previously mentioned, are supported at intervals along the length of a transverse supporting bar 24, which in turn is secured between the plates 22—22 near the upper ends thereof.

A gear unit, designated generally by the numeral 25, is provided including a first gear 26 keyed to the shaft 21 at the left end of the slower roll 13. The faster roll 12 is also a solid cylinder and is similarly provided with a short shaft 27 at either end, with the shafts 27—27 being journalled between the plates 22—22. A second gear (not shown) of the unit 25 is keyed to the shaft 27 at the left end of the faster roll 12 and meshes with the gear 26 to drive the roll 12 from the roll 13 in predetermined synchronism therewith. The meshing gears are of such preselected sizes that the peripheral speed of the roll 13 is a predetermined amount less than the peripheral speed of the faster roll 12.

The bare wire 14 and the split sheath 16 are directed vertically downward by the rolls 12 and 13 into an open space therebelow, with the split sheath 16 tending to follow a path to the right of the bare wire 14 because the sheath 16 has been split longitudinally along the left side thereof, adjacent to the faster roll 12 as viewed in Fig. 3. The above-described splitting operation is generally in accordance with the principles of the before-mentioned Bunch et al. application.

When a sheath has been split longitudinally in this manner, there is a tendency for the split sheath 16 to adhere to the bare wire 14. Further, it is desirable to collect the wire 14 and the sheath 16 in separate receivers to enable separate salvage. Therefore, according to the principles of the present invention, an apparatus designated generally by the numeral 30 is provided for separating the split sheath 16 from the bare wire 14 and for directing the separated sheath 16 and the bare wire 14 to separate receivers. It should be understood that, although the separating apparatus 30 is preferably used in combination with the differential-speed sheath-splitting rolls 12 and 13, it would also find utility in combination with various other stripping arrangements, such as the apparatus disclosed in the related copending sole application of applicant T. T. Bunch, Serial No. 801,845, filed on March 25, 1959, wherein crushing rolls are disclosed having different surface coefficients of friction with respect to the sheath.

The separating apparatus 30 includes four guide blocks 31—31, mounted one in alignment with each of the sheathed wires 10—10 and directly below the rolls 12 and 13. The guide blocks 31—31 are mounted at intervals along the length of a transverse supporting rod 32, which in turn is secured between the opposing plates 22—22. Each of the guide blocks 31—31 is provided with a V-shaped channel 33 designed to receive the bare wire emerging from the rolls 12 and 13 and to deliver the wire 14 to an associated one of a plurality of restricted peripheral grooves 34—34 in a horizontally mounted guide pulley 36.

As illustrated in somewhat exaggerated fashion in Fig. 4, the width of the groove 34 is only slightly greater than the diameter of the bare wire 14; for example, the clearance over the wire diameter may be about 0.01". This extremely slight clearance insures that only the bare wire 14 and not the larger split sheath 16 will enter the groove 34. The pulley 36 is provided with stub shafts 37—37 at the ends thereof, which may be journalled for free rotation between the opposing support plates 22—22. If desired, an independent grooved disc may be provided for each wire 14 and, in addition, it may be preferable for many applications to drive the pulley 36 in synchronized relation to the rolls 12 and 13.

Each of the bare wires 14—14 travels for approximately 90° around the periphery of the pulley 36 and is directed therefrom horizontally, as viewed in Fig. 2, to a slipping belt-type capstan designated generally by the numeral 38. The capstan 38 functions to receive the wires 14—14 emerging from the rolls 12 and 13 and to deliver them vertically downward into an open-topped, wheeled truck 39 which is mounted directly below the capstan 38.

The belt-type capstan 38 includes a positively driven drum 41, which extends across the apparatus as viewed in Fig. 1 to engage each of the four advancing wires 14—14. The capstan drum 41 is keyed to a shaft 42 which is journalled for rotation between a second pair of support plates 43—43. The plates 43—43 are in turn secured between the support posts 19 and 23 at the left of Fig. 2 and project cantilever-fashion therefrom. A suitable drive motor 44 (Fig. 1) is provided to drive the shaft 42 and rotate the capstan drum 41 in predetermined synchronism with the average speed of rotation of the rolls 12 and 13. Otherwise, the capstan drum 41 could be driven through appropriate speed-changing means (not shown) from the drive motor 17 for the roll 13.

The capstan 38 also includes three idler sheaves 46—46, which are journalled for free rotation between the plates 43—43 and which are spaced from each other and from the capstan drum 41, as viewed in Fig. 2, so that an endless belt 47 may be wound between the three idler sheaves 46—46 with the belt 47 engaging a 90°-portion of the periphery of the capstan drum 41. The bare wires 14—14 are directed between the belt 47 and the outer surface of the drum 41 for advancement upon rotation of the capstan drum 41 by the motor 44.

The speed of rotation of the drum 41 should correspond to a wire speed equal to the maximum expected speed of delivery of the wires 14—14 by the rolls 12 and 13. With this provision, no slack may occur in the span between the capstan 38 and the rolls 12 and 13, and the wires 14—14 will be maintained taut over that span to keep the wires 14—14 firmly against the bottoms of the grooves 34—34 in the pulley 36. With this arrangement, the wires 14—14 slip on the periphery of the capstan drum 41 in the event that the wires 41—41 are delivered by the rolls 12 and 13 at a slower rate and the speed of delivery by the capstan 38 equals the speed of the wires 14—14 advancing thereto. Thus, the maximum speed of delivery of the wires 14—14 into the truck 39 depends on the speed of rotation of the capstan drum 41; whereas, the minimum speed is determined by the speeds of rotation of the rolls 12 and 13.

A flat blade 48, having the shape illustrated in Fig. 2, is associated with each of the grooves 34—34 in the pulley 36. As shown in Fig. 4, the blades 48—48 have widths slightly less than the widths of the associated grooves 34—34, so that portions of the blades 48—48 enter the associated grooves 34—34 to positions near the wires 14—14 so as to provide sufficient clearances for the wires 14—14 to advance therepast. The blades 48—48 are mounted at their lower ends at intervals along the length of a crossbar 49, which is turn is secured between the plates 22—22.

The split sheaths 16—16 passing downward from the rolls 12 and 13 travel over curved upper ends of the blades 48—48, as viewed in Fig. 2, which deflect the sheaths 16—16 away from the grooves 34—34 in the pulley 36. The deflected sheaths 16—16 travel downward adjacent to the outer surface of the pulley 36 into a receiving truck 51, which is positioned below the separating apparatus 30. Thus, the bare wires 14—14 and the split sheaths 16—16 have effectively been separated by the apparatus 30 for collection in separate receivers 39 and 51, respectively.

It should be noted that, in Fig. 1, the sheathed wires 10—10 have been broken away above the roll 13 and the split sheaths 16—16 have been broken away below the capstan drum 41 to illustrate the separating apparatus 30 more clearly and that, in Fig. 4, the sheath 16 has likewise been broken away for the same purpose.

It will be obvious that this invention is not limited to the specific details described in connection with the above embodiment of the invention, but that various modifications may be made without departing from the spirit and scope thereof.

What is claimed is:

1. In a stripping apparatus of the type wherein a wire sheathed with a plastic material is fed vertically downward between a pair of rolls which split the sheath longitudinally; an improved apparatus for separating the split sheath from the bare wire, which comprises a rotatable pulley mounted below the rolls and having a restricted peripheral groove of a width slightly greater than the diameter of the bare wire in which groove the bare wire is received, an open-topped receiver for the bare wire, a slipping capstan for advancing the bare wire around a portion of the grooved periphery of said pulley and for delivering the bare wire into the wire receiver at a speed substantially equal to the speed at which the bare wire is discharged by the rolls, an open-topped receiver for the split sheath, and a separating blade entering the groove in said pulley and designed for deflecting the split sheath away from the groove and downward into the sheath receiver.

2. Apparatus for stripping a sheath of plastic material from a sheathed wire, which comprises a pair of rolls arranged so that the sheathed wire advances vertically downward therebetween and so that the sheath is longitudinally split along one side by said rolls, an inclined guide member mounted below said rolls and having a V-shaped channel designed for receiving the bare wire emerging from said rolls, a rotatable pulley mounted below said guide member and having a restricted peripheral groove of a width slightly greater than the diameter of the bare wire in which groove the bare wire is received, said guide member being so arranged that the V-shaped guide channel delivers the bare wire into the peripheral groove in said pulley, an open-topped receiver for the bare wire, a slipping belt-type capstan for advancing the bare wire around a portion of the grooved periphery of said pulley and for delivering the bare wire into the wire receiver at a speed substantially equal to the speed at which the bare wire is discharged by said rolls, an open-topped receiver for the split sheath, and a separating blade entering the groove in said pulley and designed for deflecting the split sheath away from the groove and downward into the sheath receiver.

References Cited in the file of this patent

UNITED STATES PATENTS

| | | |
|---|---|---|
| 1,052,271 | Pessin | Feb. 4, 1913 |
| 2,366,271 | Lerch | Jan. 2, 1945 |
| 2,425,123 | Quayle et al. | Aug. 5, 1947 |
| 2,485,518 | Vermette | Oct. 18, 1949 |
| 2,882,188 | Levin et al. | Apr. 14, 1959 |